United States Patent

Yamamoto et al.

[11] Patent Number: 5,813,788
[45] Date of Patent: Sep. 29, 1998

[54] COUPLING AND METHOD OF MANUFACTURING SAME

[75] Inventors: Yoshimi Yamamoto, Mikkabi, Japan; Gunnar Eriksson, Nygatan, Sweden

[73] Assignee: Fuji Kiko Co., Ltd., Tokyo, Japan

[21] Appl. No.: 708,231

[22] Filed: Sep. 6, 1996

[30] Foreign Application Priority Data

Sep. 8, 1995 [JP] Japan ................................. 7-230602

[51] Int. Cl.⁶ ................................................. F16D 3/00
[52] U.S. Cl. ....................... 403/57; 403/157; 403/DIG. 8; 464/134
[58] Field of Search .................. 403/57, 74, 79, 403/157, 234, 374, 290, 320, 24, DIG. 8, 237; 464/134, 135

[56] References Cited

U.S. PATENT DOCUMENTS

| 2,067,283 | 1/1937 | Padgett | 464/134 |
|---|---|---|---|
| 2,509,285 | 5/1950 | Bendicson | 403/157 X |
| 2,596,632 | 5/1952 | Whitehead | 403/79 X |
| 3,867,050 | 2/1975 | Pitner | 464/134 X |
| 3,895,878 | 7/1975 | Pitner | 403/344 |
| 3,901,048 | 8/1975 | Pitner | 464/134 |
| 4,361,024 | 11/1982 | Haldric | 72/379 |
| 4,702,722 | 10/1987 | Narue et al. | 464/134 X |
| 5,358,350 | 10/1994 | Oertle | 403/12 |
| 5,362,170 | 11/1994 | Fevre | 403/57 |

FOREIGN PATENT DOCUMENTS

| 0 553 613 | 8/1993 | European Pat. Off. . | |
|---|---|---|---|
| 755464 | 9/1933 | France | 403/57 |
| 3-78491 | 12/1991 | Japan . | |
| 457418 | 11/1936 | United Kingdom | 464/135 |
| 8798501 | 8/1946 | United Kingdom | 464/134 |
| 1214244 | 12/1970 | United Kingdom | 464/134 |
| 1 551 850 | 9/1979 | United Kingdom . | |
| 2 051 307 | 1/1981 | United Kingdom . | |

Primary Examiner—Harry C. Kim
Attorney, Agent, or Firm—Foley & Lardner

[57] ABSTRACT

A coupling for a vehicle steering unit includes a first linking section including two leg portions extending from a hub portion and a second linking section including two wings extending from and integrated to the hub portion and protrusions on the wings pierced with holes for the passage of a tightening bolt for tightening the wings to bear radially on a shaft. The wings are terminated at a longitudinal slot extending substantially in parallel to an axis of rotation of the coupling. This longitudinal slot is wide enough to allow the passage of the shaft.

11 Claims, 5 Drawing Sheets

COUPLING AND METHOD OF MANUFACTURING SAME

BACKGROUND OF THE INVENTION

1. Field of the Invention

The present invention relates to a coupling connected on one hand to a torque transmitting device and on the other hand to a receiving device, and more particularly relates to a coupling which is useful in steering units of automotive vehicles.

2. Description of the Prior Art

In a known steering unit as shown in JP-B 3-78490 or JP-B 3-78491, a steering shaft is connected via a lower joint to a steering gear unit. The lower joint includes a lower shaft having at one end thereof a yoke linked via a trunnion with a yoke of the steering shaft. At an opposite end thereof, the lower shaft has a yoke linked via a trunnion with a yoke of a gear shaft of the steering gear unit. In order to diminish transmission of road vibration from the road wheels, a rubber is interposed and connected between the yoke linked to the yoke on the steering shaft and the one end of the lower shaft. For connection with the rubber, the lower shaft includes two fastening legs which are extending in the opposite directions and arranged in a plane substantially perpendicular to the shaft axis, i.e., the rotation axis of the lower shaft. At a portion adjacent the opposite end thereof, the lower shaft is splined for spline connection with the yoke linked with the yoke of the gear shaft.

During manufacture of automotive vehicles, the steering unit is installed after an engine and a front drive unit including the steering gear unit have been mounted at a front section of an automotive vehicle and the steering shaft has been mounted to the vehicle body with a steering wheel held in an appropriate position within the vehicle cabin. Thus, the connection between the steering shaft and the lower shaft is carried out from the vehicle cabin and at a front portion thereof which is not well lit under normal factory conditions. Since the lower shaft requires axial adjustment relative to the rubber before securing the fastening legs thereof to the rubber by bolts and nuts, considerable time and skilled labor are required.

In order to solve this problem, it has been proposed to attach a coupling to the rubber by bolts and nuts. The coupling which may be used is known from U.S. Pat. No. 4,361,024. This known coupling comprises an axially slotted hub forming a socket for one end portion of a lower shaft and having a lug depending from each side of the slot. The lugs are planar and pierced for the passage of a bolt. The hub has two fastening legs which are arranged in a plane substantially perpendicular to the longitudinal axis, i.e., the rotation axis of the coupling. Each of the fastening legs are pierced for the passage of a bolt.

An object of the present invention is to provide an alternative to a coupling of the above-mentioned type, which is formed from a sheet-metal blank and which allows less time and labor in linking the coupling to the shaft.

SUMMARY OF THE INVENTION

According to one aspect of the present invention, there is provided a coupling for coupling a torque transmitting device to a receiving device, comprising:

a first linking section adapted to be secured to the torque transmitting device; and a second linking section including a first and a second wing opposed in a spaced relation to each other and defining a longitudinal slot for the passage of the receiving device, and means for securing the receiving device, said first linking and second linking sections being connected to each other.

According to another aspect of the present invention, there is provided a method of forming from a sheet of metal a coupling having a first linking section, and a second linking section including a first and a second wing opposed in a spaced relation to each other and defining a longitudinal slot for the passage of a shaft and protrusions pierced with holes for the passage of a tightening bolt for tightening the first and second wing to bear radially on the shaft, the method comprising the steps of:

punching a sheet of metal to form a sheet-metal blank; and bending said sheet-metal blank to form the first and second wing with the protrusions.

DETAILED DESCRIPTION OF THE INVENTION

Figure 1:
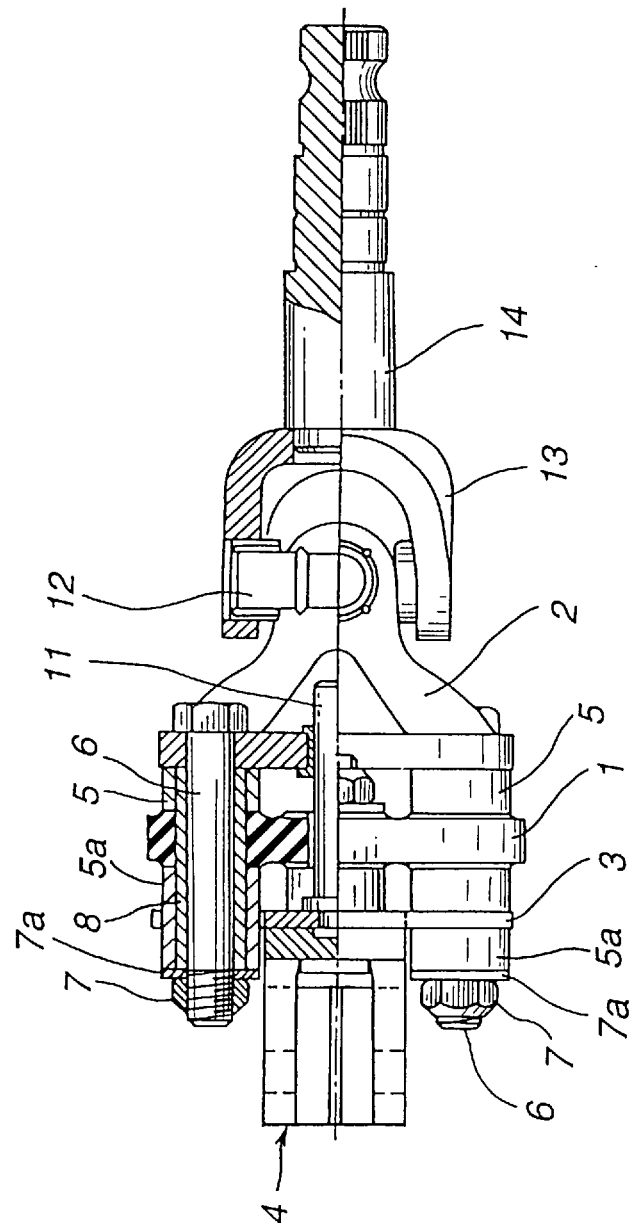
FIG. 1 is a top plan view, partly broken away, of a universal joint linking a steering shaft to a lower shaft, not shown, employing a first embodiment of a coupling according to the present invention.
Figure 2:
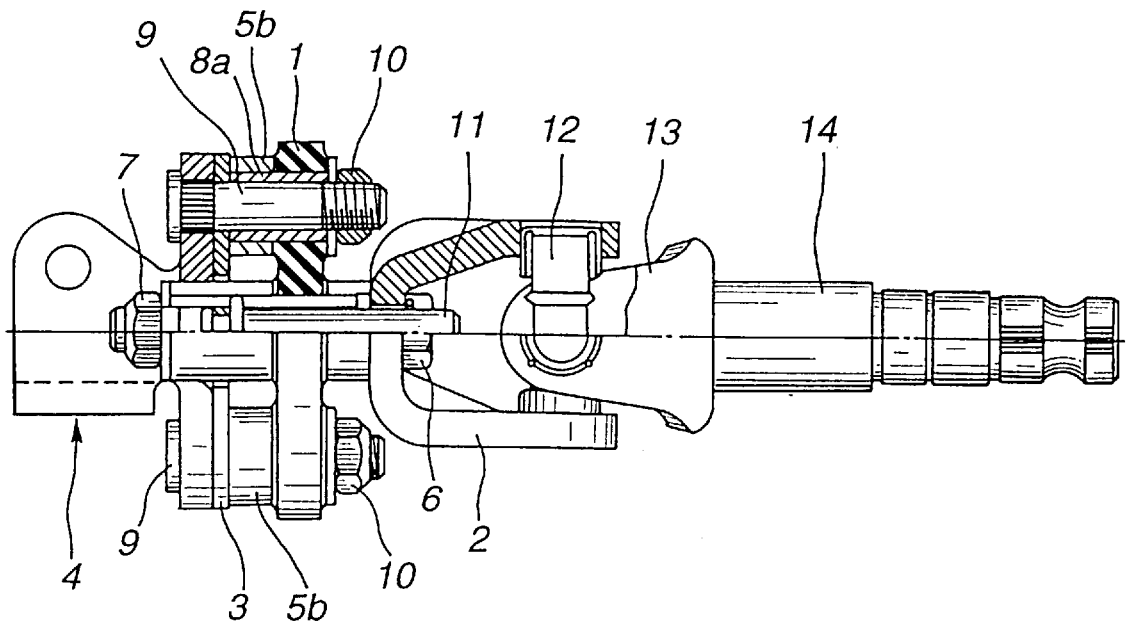
FIG. 2 is a front elevational view, partly broken away, of the universal joint.
Figure 3:
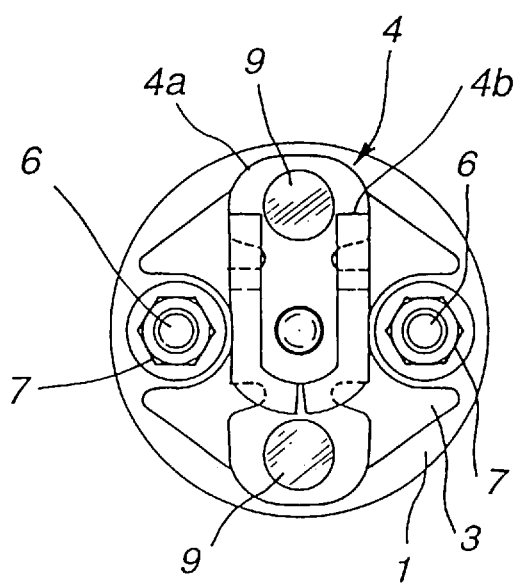
FIG. 3 is a lefthand view viewing FIG. 2 from the left.

Referring to FIGS. 1 to 3, the reference numeral 4 generally denotes a first embodiment of a coupling according to the present invention, the reference numeral 14 denotes a steering shaft having a yoke 13 of a universal joint. The yoke 13 is linked with a second yoke 2 of the universal joint by a trunnion 12, and the reference numeral 1 denotes an elastic member in the form of a rubber disc. The yoke 2 is disposed on one side of the rubber disc 1. Disposed on the opposite side of the rubber disc 1 is a plate 3 which has a central pin 11 projecting from one face thereof. The pin 11 slidably extends through center portions of the rubber disc 1 and the yoke 2, The coupling 4 is disposed on the opposite face of the plate 3. Arranged around the pin 11 and extending through the rubber disc 1 are two relatively long collars, only one being shown at 8 in FIG. 1, and two relatively short collars, only one being shown at 8a in FIG. 2. The two relatively long collars 8 are diametrically opposed to each other with respect to a longitudinal axis of the pin 11, i.e., the axis of rotation of the yoke 2, and the two relative short collars 8a are diametrically opposed to each other with respect to the longitudinal axis of the pin 11. These four collars 8 and 8a are equi-angularly spaced one after another with respect to the axis of the pin 11. As seen from FIG. 1, each of the collars 8 allows the passage of a bolt 6. With the bolts 6 and the mating nuts 7, the rubber disc 1 is fixed to the yoke 2. In order to hold the rubber disc 1 in a spaced relation to the yoke 2, a spacer 5 is fitted around each of the collars 8 and disposed between the yoke 2 and one face of the rubber disc 1. Disposed between the opposite face of the rubber disc 1 and a washer 7a on which the nut 7 seats is another spacer 5a fitted around the corresponding one of the collars 8. With these spacers 5a, the nuts 7 are held in a spaced relation with the rubber disc 1. As seen from FIG. 2, each of collars 8a allows the passage of a bolt 9. With the bolts 9 and the mating nuts 10, the plate 3 and the coupling 4 are fixed to the rubber disc 1. In order to hold the plate 3 in a spaced relation to the rubber disc 1, a spacer 5b is disposed between the opposite face of the rubber disc 1 and the plate 3. The spacers 5a are fitted around the collars 8a, respectively.

Figure 4:
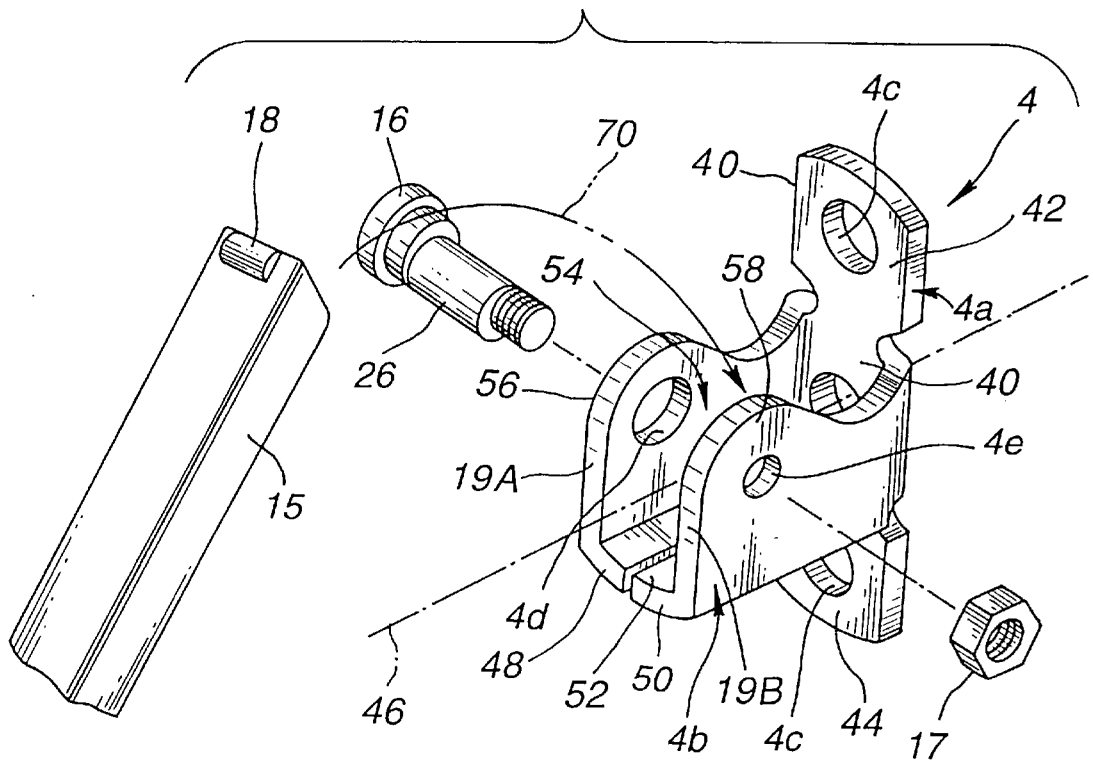
FIG. 4 is a perspective view of the first emboiment of the coupling with a bolt, a nut and a lower shaft.
Figure 5:
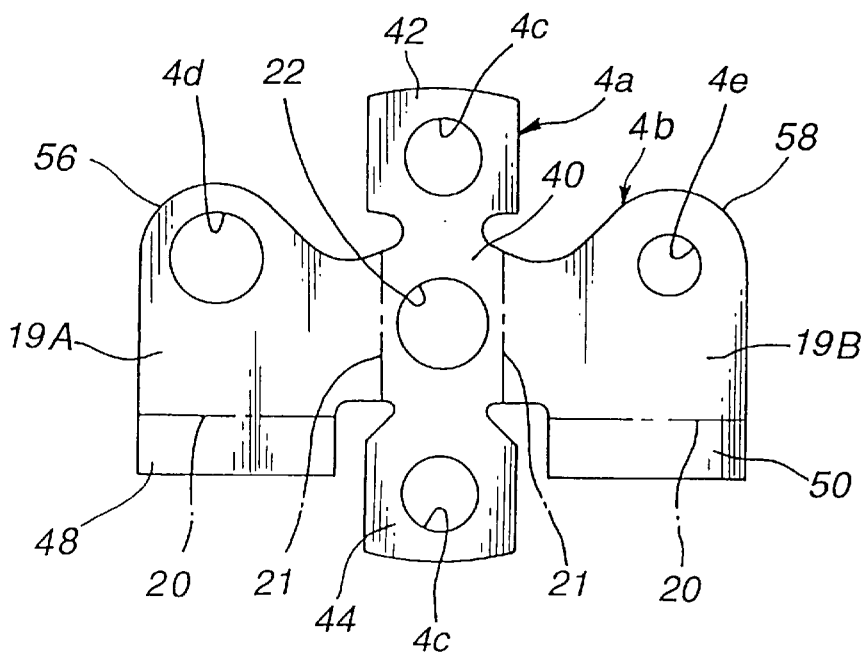
FIG. 5 is a top plan view of a sheet-metal blank from which the first embodiment of the coupling is formed.

FIG. 4 is a perspective view of the coupling 4 formed from a sheet-metal blank as shown in FIG. 5 by bending and welding. The coupling 4 includes two sections, namely a first linking section 4a and a second linking section 4b. The first linking section 4a is designed for linking the coupling 4 with a torque transmitting device. In this case under consideration, the torque transmitting device is in the form of the plate 3 secured to the rubber disc 1. The second linking section 4b is designed for linking the coupling 4 with a torque receiving-device in the form of a lower shaft 15 (see FIG. 4).

The first linking section 4a includes a hub portion 40 and two fastening leg portions 42 and 44 extending in opposed directions from the hub portion 40. These leg portions 42 and 44 are connected to and integrated to the hub portion 40. The hub portion 40 and the two leg portions 42 and 44 are arranged in a plane and integrated with each other to make up an elongate flat plate. The hub portion 40 is formed with a hole 22 for receiving one end portion of the pin 11. Each of the leg portions 42 and 44 is formed with a fastening hole 4c for the passage of the corresponding one of the bolts 9.

Figure 6:
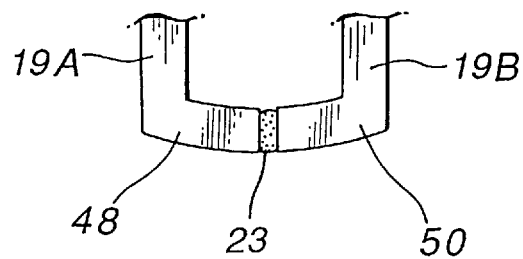
FIG. 6 is an enlarged fragmentary view of FIG. 4.

The second linking section 4b includes wings 19A and 19B which are opposed to each other in a spaced relation and located on both sides of a longitudinal axis 46 of the coupling 4, i.e., the rotation axis of the coupling 4. The wings 19A and 19B extend from the hub portion 40 of the first linking section 4a and integrated therewith. The wings 19A and 19B have integral lugs 48 and 50 which are curved toward each other and joined to each other by welding at a seam 23 as shown in FIG. 6. The wings 19A and 19B and the integral lugs 48 and 50 cooperate with each other to define a socket 52 in which the shaft 15 is fitted. The wings 19A and 19B are terminated at a longitudinal slot 54 which is subtantially parallel to the longitudinal axis 46 and which is wide enough to allow the passage of the shaft 15 into the socket 52. Located on both sides of the longitudinal slot 54 are protrusions 56 and 58 integrated with the wings 19A and 19B, respectively. The protrusions 56 and 58 are formed with holes 4d and 4e, respectively, which holes have the same axis in order to form an assembly axis of a fastening unit comprising a tightening bolt 16 and a nut 17. The protrusion 56 and the wing 19A are arranged in one plane, while the other protrusion 58 and the wing 19B are arranged in another plane substantially parallel to the one plane.

A flat sheet metal is punched by stamping operation to provide the sheet-metal blank, as shown in FIG. 5, including the hub portion 40 pierced with the hole 22, two leg portions 42, 44 pierced with the holes 4c, 4c, respectively, the wings 19A, 19B with lugs 48, 50, respectively and the projections 56, 58 pierced with holes 4d, 4e, respectively. The sheet-metal blank is dent at bending lines 21 and at bending lines 20 by bending operation and then the lugs 48 and 50 are joined by welding at the seam as shown in FIG. 6 to form the second linking section 4b described above.

Figure 7:
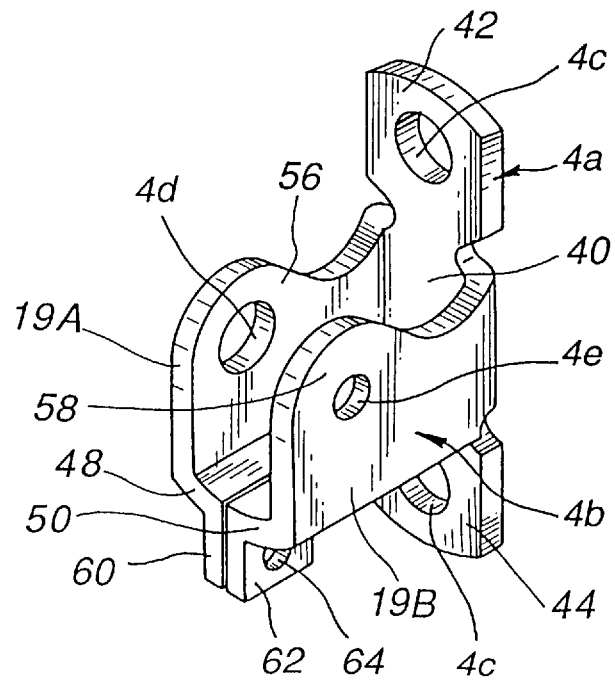
FIG. 7 is a perspective view of a second embodiment of a coupling according to the present invention.

According to another embodiment shown in FIG. 7, lugs 48 and 50 have flanges 60 and 62 pierced with holes, only one being shown at 64, for the passage of a fastening unit, not illustrated, including a tightening bolt for joining the lugs 48 and 50 to each other.

As shown in FIG. 4, one end portion of the shaft 14 and the socket 52 present complementary profiles. The shaft 15 is pivotable at the opposite end thereof so that one end portion thereof can move within a radial plane of the longitudinal axis 46. Thus, one can move the one end portion of the shaft 15 along a course as illustrated by an arrow 70 to bring into alignment with the longitudinal slot 54 and fit the one end portion of the shaft 15 in the socket 52. After the passage of the bolt 16 through the holes 4d and 4e of the projections 56 and 58, screwing of the bolt 16 into the nut 17 acts to draw one projection 56 or 58 toward the other. By this function of the fastening unit, the shaft 15 is held in the socket 52 by radial pressure of the wings 19A and 19B onto the shaft 15.

Preferably, the shaft 15 has an integral projection 18 adjacent the one end thereof for the prevention of axial removal thereof from the shocket 52. Radial removal of the shaft 15 through the longitudinal slot 54 is prevented by the bolt 16.

Figure 8:
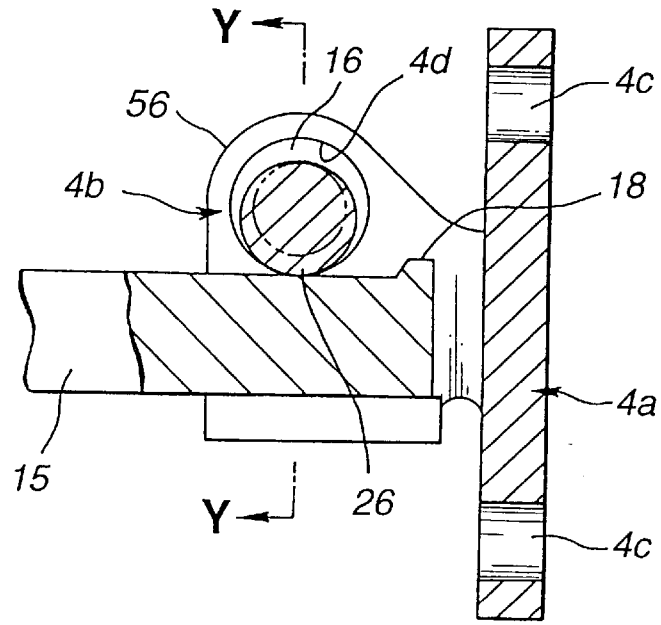
FIG. 8 is an enlarged fragmentary view, partly borken away, of the first embodiment of the coupling to illustrate the relationship between the bolt, lower shaft and coupling.
Figure 9:
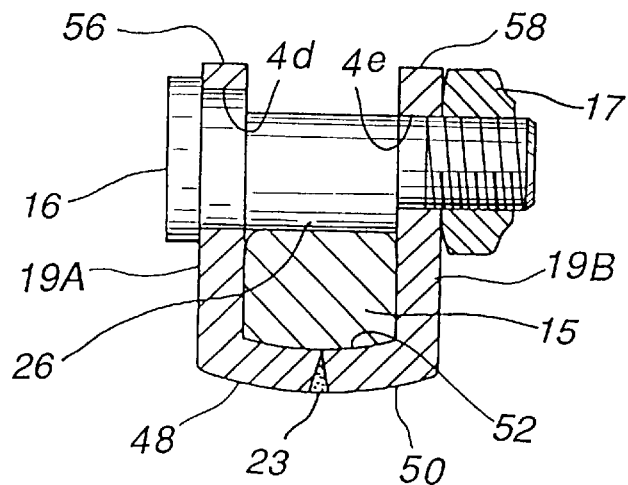
FIG. 9 is a section taken through the line Y—Y of FIG. 8.
Figure 10:
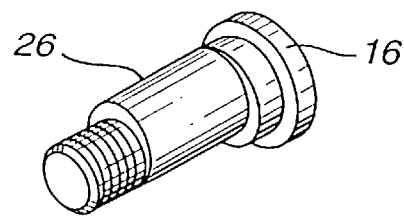
FIG. 10 is a perspective view of the bolt.

There exists a clearance between the shaft 15 and the bolt 16 for the passage of the bolt 16 through the holes 4d and 4e over the shaft 15 fitted in the socket 52. If need arises to reduce this clearance to zero, the bolt 16 should have an eccentric portion 26 as best seen in FIG. 10. In this case, the hole 4d is larger than the other hole 4e for receiving the eccentric portion 26 of relatively large in diameter. FIGS. 8 and 9 show the eccentric portion 26 firmly engaged with the one end portion of the shaft 15 to hold the shaft 15 in the socket 52 by radial pressure of the eccentric portion 26 onto the shaft 15 in addition to radial pressure of the wings 19A and 19B onto the shaft 15. The eccentric portion 26 has a length slightly shorter than the width between the projections 56 and 58 in an unstresses state.

From the preceding description, it will now be understood that since the longitudinal slot 54 allows the passage of the shaft 15, one can install the steering unit easily and quickly.

From the preceding description, it is now appreciated that the coupling 4 is formed from a sheet metal easily without any considerable expense. Thus, considerable expense is saved and manufacturing is simplified.

While the present invention has been illustrated and described in accordance with preferred embodiments, it is recognized that variations and changes may be made therein without departing from the invention as set forth in the claims.

What is claimed is:

1. A coupling, for coupling a torque transmitting device to a receiving device, comprising:
   a first linking section adapted to be secured to the torque transmitting device, said first linking section including a hub portion and two leg portions connected and integrated to said hub portion, said hub portion and two leg portions being arranged in a plane perpendicular to an axis of rotation of the coupling;
   a second linking section including a first wing and a second wing opposed in a spaced relation to each other, said first and second wings defining a longitudinal slot allowing the passage of the receiving device, said longitudinal slot being substantially parallel to the axis of rotation of the coupling, and an arrangement securing the receiving device, said securing arrangement including protrusions located on both sides of said longitudinal slot and respectively integrated with said first and second wings, a first of said protrusions and said first wing being arranged in a first plane and a second one of said protrusions and said second wing being arranged in a second plane substantially parallel to said first plane, said protrusions being formed with coaxial holes in order to form an assembly axis of a fastening unit including a tightening bolt and a nut;

said first and second linking sections being connected to each other and being formed from a single sheet of metal.

2. A coupling as claimed in claim 1, wherein said tightening bolt has an eccentric portion.

3. A coupling as claimed in claim 1, wherein said hub portion and two leg portions are integrated with each other to form an elongate flat plate.

4. A coupling as claimed in claim 1, wherein said first and second wings extend from said hub portion and are integrated therewith.

5. A coupling as claimed in claim 4, wherein said first and second wings are connected to said hub portion at respective bending lines located on opposite sides of the axis of rotation of the coupling.

6. A coupling as claimed in claim 5, wherein said first and second wings have respective integral lugs bent toward each other and jointed to each other.

7. A coupling as claimed in claim 6, wherein said first and second wings and said integral lugs cooperatively define a socket for the receiving device.

8. A coupling as claimed in claim 7, wherein said socket and the receiving device have complementary profiles.

9. A coupling as claimed in claim 8, wherein said first and second wings define lateral boundaries of said longitudinal slot.

10. A coupling as claimed in claim 9, wherein said lugs are welded to each other.

11. A coupling as claimed in claim 9, wherein each of said lugs have a flange, and each flange has a hole for the passage of a fastener.

\* \* \* \* \*